United States Patent Office 3,647,826
Patented Mar. 7, 1972

3,647,826
INDANE DERIVATIVES
John B. Hall, Oakhurst, N.J., assignor to International Flavors & Fragrances Inc., New York, N.Y.
No Drawing. Filed Aug. 18, 1969, Ser. No. 851,090
Int. Cl. C07d 1/00
U.S. Cl. 260—348 C     1 Claim

ABSTRACT OF THE DISCLOSURE

Saturated epoxyindane derivative having the formula

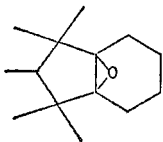

perfume compositions containing such epoxyindane and processes for producing same.

BACKGROUND OF THE INVENTION

There is a continuing need for fragrance materials having persistent woody odors with satisfactory overtones or qualities. While many natural products have woody fragrances, the more desirable of these are frequently in short supply and hence difficult to obtain and expensive. Moreover, it is also most desirable that such woody fragrance character have good persistence so that the substances can be used in quality formulations for perfume or other olfactory compositions. Such materials should also possess good blending qualities so that they are useful in preparing perfume compositions.

THE INVENTION

Briefly, the present invention provides the novel epoxyindane derivative, 3a,7a-epoxyhexahydro-1,1,2,3,3-pentamethylindane, having the formula

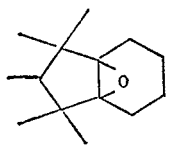

This substance has a good fine-pine woody odor. Thus, the present invention also provides novel perfume and fragrance compositions containing such epoxyindane, and processes for producing such epoxyindane are also disclosed herein.

It will be appreciated by those skilled in the art from the present disclosure that the indane derivative according to this invention can exist in two stereo-isomeric forms. It is contemplated that the structural formula given herein includes the several isomeric forms.

A convenient starting material according to the present invention is pentamethylindane. The pentamethylindane is hydrogenated to provide the tetrahydro derivative as the first step in the synthesis of the epoxyindane. The double bond is then oxidized with a suitable agent to obtain the epoxyindane. The hydrogenation is carried out under controlled conditions to add two moles of hydrogen to each mole of the indane. It is preferred to use metallic catalysts such as Raney nickel, as well as palladium and other noble metal catalysts, and the like.

The hydrogenation is carried out at substantially superatmospheric pressures, desirably from 50 to 200 atmospheres. The hydrogenation is preferably carried out at 60 to 130 atmospheres. This reaction is desirably carried out at temperatures in excess of 100° C. up to 225° C., and a preferred temperature range is 150° to 190° C.

The 4,5,6,7-tetrahydropentamethylindane so obtained is then oxidized to provide the epoxy oxygen substituent on the 3a,7a bridge carbon atoms. The oxidation is carried out with an oxidizer such as a percarboxylic acid. Thus, peracids such as peracetic, perpropionic, perbenzoic, perphthalic, and the like are used. In preferred embodiments of the process, lower aliphatic percarboxylic acids are used. Thus, peracetic acid can be used, although a combination of acetic anhydride and hydrogen peroxide is equivalent. The amount of percarboxylic acid used should be about stoichiometric, although slight excesses up to about ten molar percent can be utilized.

This reaction can be carried out at pressures above or below atmospheric, but atmospheric pressure is desired to minimize ebullition of any reaction vehicle and provide an acceptable reaction rate, while maintaining control over the reaction. The temperatures used are in the range of 10° to 50° C., and are preferably in the range of from 20° to 30° C.

The reaction can be carried out in the presence of a vehicle. For example, when peracetic acid is used, acetic acid can serve as the reaction vehicle. An alkali metal salt of a carboxylic acid can additionally be present to adjust the pH of the reaction vehicle. Such acid salt is preferably the acid corresponding to the carboxylic acid. Thus, sodium acetate is used with peracetic acid. Lower carboxylic acid salts are preferred.

The epoxyindane produced according to the above reaction can be separated from the vehicle and any unreacted materials or unwanted by-products removed by conventional means including washing, distillation, crystallization, extraction, preparative chromatography, and the like. It is preferred to fractionally distill the washed reaction product under a relatively high vacuum so as to obtain a pure product. Product purities of 80% are readily obtained, and much higher purities can also be provided by suitable treatment. All parts, proportions, percentages and ratios herein are by weight unless otherwise indicated.

The epoxypentamethylindane of this invention is useful as a fragrance. It can be used to contribute a woody fragrance. As an olfactory agent the epoxyindane of this invention can be formulated into or used as a component of a "perfume composition."

The term "perfume composition" is used herein to mean a mixture of organic compounds, including, for example, alcohols, aldehydes, ketones, esters and frequently hydrocarbons which are admixed so that the combined odors of the individual components produce a pleasant or desired fragrance. Such perfume compositions usually contain: (a) the main note or the "bouquet" or foundation-stone of the composition; (b) modifiers which round-off and accompany the main note; (c) fixatives which include odorous substances which lend a particular note to the perfume throughout all stages of evaporation, and substances which retard evaporation; and (d) top notes which are usually low-boiling fresh-smelling materials.

In perfume compositions the individual component will contribute its particular olfactory characteristics, but the overall effect of the perfume composition will be the sum of the effect of each ingredient. Thus, the compound of this invention can be used to alter the aroma characteristics of a perfume composition or other composition, for example, by highlighting or moderating the olfactory reaction contributed by another ingredient in the composition.

The amount of the epoxyindane which will be effective in perfume compositions depends on many factors, including the other ingredients, their amounts and the effects which are desired. It has been found that perfume compositions containing as little as 2% by weight of the compound of this invention, or even less, can be used to impart a woody pine odor to soaps, cosmetics, and other products. The amount employed can range up to 7% or higher and will depend on considerations of cost, nature of the end product, the effect desired on the finished product and the particular fragrance sought.

The epoxyindane of this invention can be used alone or in a perfume composition as an olfactory component in detergents and soaps; space deodorants; perfumes; colognes; bath preparations such as bath oil, bath salts; hair preparations such as lacquers, brilliantines, pomades and shampoos; cosmetic preparations such as creams, deodorants, hand lotions, and sun screens; powders such as talcs, dusting powders, face powder, and the like. When used as an olfactory component of a perfumed article, as little as 0.01% of the novel epoxyindane will suffice to impart a pine-woody odor.

In addition, the perfume composition can contain a vehicle or carrier for the other ingredients. The vehicle can be a liquid such as alcohol, glycol, or the like. The carrier can be an absorbent solid such as a gum or components for encapsulating the composition.

It will be appreciated that the epoxypentamethylindane derivative according to this invention can be used to enhance, alter, modify, or supplement the fragrance properties of natural or synthetic fragrance compositions. Thus, such epoxyindane can be used in fragrance compositions for addition to perfume compositions or directly to products such as soap, detergents, cosmetics, and the like. The fragrance compositions so prepared do not entirely provide the olfactory properties to the finished perfume or other article, but they do furnish a substantial part of the overall fragrance impression.

The following examples are given to illustrate embodiments of the invention as it is presently preferred to practice it. It will be understood that these examples are illustrative, and the invention is not to be considered as restricted thereto except as indicated in the appended claims.

EXAMPLE I (a) Preparation of 4,5,6,7-tetrahydro-1,1,2,3,3-pentamethylindane

The following ingredients are charged into a stainless steel five-liter autoclave equipped with a hydrogen gas feed.

1,800 g. (8.14 moles) of 1,1,2,3,3-pentamethylindane (85% pure)
90 g. of Raney nickel.

Enough hydrogen is fed into the autoclave to raise the pressure to 1,000 p.s.i.g. The hydrogen feed is then continued at 3 ml./min., and the autoclave is heated up to a temperature in the range of 150–185° C. over a period of 8 hours. During this time the pressure in the autoclave is maintained at 1,500 p.s.i.g.

The 1,641 g. of crude product obtained from the autoclave is distilled on a 12-inch Goodloe column after being mixed with 10.0 g. of Primol mineral oil. The distillate is recovered in two fractions:

Fraction I: Distills at a temperature of 80° C. and 4.0 mm. Hg to provide 401 g. of 4,5,6,7-tetrahydro-1,1,2,3,3-pentamethyl indane.

Fraction II: Distills at a temperature range of 86–88° C. and 3.5–3.8 mm. Hg to provide 729 grams of hexahydro-1,1,2,3,3-pentamethylindane.

A sample of Fraction I is further refined on a six-foot by ¾ inch gas liquid chromatographic (GLC) column containing 20% Carbowax polyethylene glycol and operated at 110° C. Analysis by infrared (IR) and proton magnetic resonance (PMR) confirms the structure:

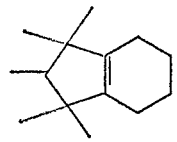

(b) Production of 3a,7a-epoxyhexahydro-1,1,2,3,3-pentamethylindane

Into a 250 ml. flask equipped with thermometer, stirrer, reflux condenser and ice bath are introduced 94 g. of the tetrahydroindane produced above and 15 g. of sodium acetate. At 25–30° C., 124 g. of 40% peracetic acid (0.65 mole) is added during four hours. After addition is completed, an equal volume of water is added to the reaction mass. The aqueous phase is separated from the organic phase and extracted with 150 ml. of toluene. The toluene extract is combined with the organic phase and washed with one volume of 5% aqueous sodium hydroxide solution and then with one volume of water.

The solvent is stripped off leaving a crude product weighing 208 g. The crude epoxy product is distilled on a 12-inch Goodloe column after addition of 4.0 g. of triethanolamine at 72–74° C. and 1.0–1.4 mm. Hg.

The resulting product has a fine pine, wood note. PMR and IR analysis of this material confirm the structure:

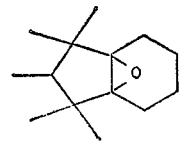

EXAMPLE II

Preparation of soap compositions

A total of 100 g. of soap chips (from a toilet soap prepared from tallow and coconut oil) is mixed with one gram of the perfume composition given below until a substantially homogeneous composition is obtained. The soap composition manifests a characteristic woody pine-like odor.

The perfume composition comprises the following ingredients:

| Ingredients: | Parts |
|---|---|
| Vetivert oil | 40 |
| Epoxide produced in Example I | 60 |
| Sandalwood oil | 100 |
| Rose geranium oil | 200 |
| Musk extract (3%) | 25 |
| Civet extract (3%) | 25 |
| Benzyl iso-eugenol | 100 |
| Coumarin | 100 |
| Heliotropin | 50 |
| Bois de Rose oil | 200 |
| Benzoin resin | 100 |
| | 1,000 |

EXAMPLE III

Preparation of a detergent composition

A total of 100 grams of a detergent powder is mixed with 0.15 gram of the perfume composition as set forth in Example II until a substantially homogeneous composition having a woody pine-like odor is obtained.

EXAMPLE IV

Preparation of a cosmetic powder composition

A cosmetic powder is prepared by mixing 100 g. of talcum powder with 0.25 g. of the epoxide obtained from the process of Example I in a ball mill. The cosmetic powder so prepared has a desirable woody odor.

EXAMPLE V

Liquid detergent

Concentrated liquid detergents with a woody odor are prepared containing 0.1%, 0.15% and 0.20% of the epoxide produced in Example I. They are prepared by adding and homogeneously mixing the appropriate quantity of the compound to Ultra Chemical Company's P–87 liquid detergent.

What is claimed is:
1. 3a,7a-epoxyhexahydro-1,1,2,3,3-pentamethylindane.

References Cited

UNITED STATES PATENTS

| | | | |
|---|---|---|---|
| 3,183,249 | 5/1965 | Wiese et al. | 260—348 |
| 3,509,215 | 4/1970 | Wood et al. | 260—592 |

FOREIGN PATENTS

| | | |
|---|---|---|
| 796,585 | 6/1958 | Great Britain. |
| 796,586 | 6/1958 | Great Britain. |

OTHER REFERENCES

Bull. Soc. Chim. Fr. (1967), vol. 7, p. 2484.

NORMA S. MILESTONE, Primary Examiner

U.S. Cl. X.R.

252—522; 260—667, 666 A